United States Patent
Hou

(10) Patent No.: US 9,766,140 B2
(45) Date of Patent: Sep. 19, 2017

(54) SURFACE MOUNT FORCE SENSING MODULE

(71) Applicant: UNEO INC., Taipei (TW)

(72) Inventor: Chih-Sheng Hou, Taipei (TW)

(73) Assignee: UNEO Inc., Taipei (TW)

( * ) Notice: Subject to any disclaimer, the term of this patent is extended or adjusted under 35 U.S.C. 154(b) by 17 days.

(21) Appl. No.: 14/823,142

(22) Filed: Aug. 11, 2015

(65) Prior Publication Data

US 2017/0045405 A1 Feb. 16, 2017

(51) Int. Cl.
*G01L 1/16* (2006.01)

(52) U.S. Cl.
CPC ........................................ *G01L 1/16* (2013.01)

(58) Field of Classification Search
CPC .... G01L 5/04; G01L 1/16; H01C 10/106; G06F 3/044
USPC ...................................................... 73/862.68
See application file for complete search history.

(56) References Cited

U.S. PATENT DOCUMENTS

| | | | | |
|---|---|---|---|---|
| 5,250,870 A * | 10/1993 | Fenlon | ................. | H03H 9/1014 310/345 |
| 7,068,142 B2 * | 6/2006 | Watanabe | ............ | H01C 10/106 338/114 |
| 7,533,582 B2 * | 5/2009 | Okada | ..................... | G01L 1/144 73/862.043 |
| 8,018,301 B2 * | 9/2011 | Huang | ................. | H03H 3/0072 333/186 |
| 8,434,369 B2 * | 5/2013 | Hou | ......................... | G01L 1/18 361/600 |
| 8,993,913 B2 * | 3/2015 | Hou | ..................... | H01H 13/785 200/534 |
| 9,377,908 B2 * | 6/2016 | Park | ....................... | G06F 3/044 |
| 2013/0342488 A1 * | 12/2013 | Schneider | ............ | G06F 3/0416 345/173 |

\* cited by examiner

*Primary Examiner* — Lisa Caputo
*Assistant Examiner* — Octavia Hollington
(74) *Attorney, Agent, or Firm* — Hauptman Ham, LLP

(57) ABSTRACT

A surface mount force sensing module is disclosed. A first embodiment shows that the surface mount force sensing module has a bottom electrode designed to be mounted on a circuit board. A second, third, and fourth embodiments show that the sensing module has a pair of bottom electrodes amenable for mounting onto a circuit board.

28 Claims, 17 Drawing Sheets

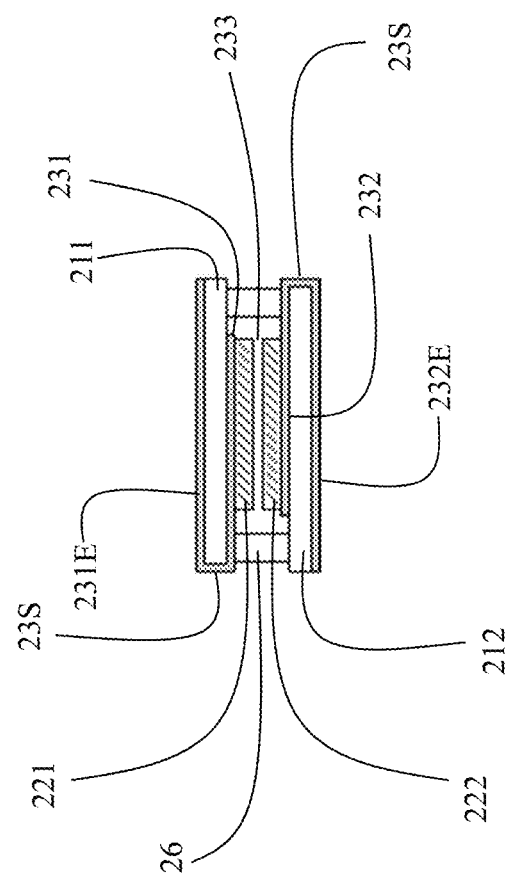
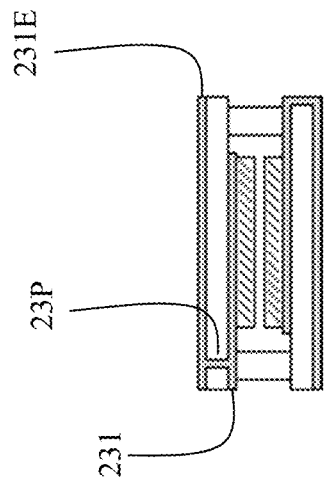
Fig.2A
Fig.2B

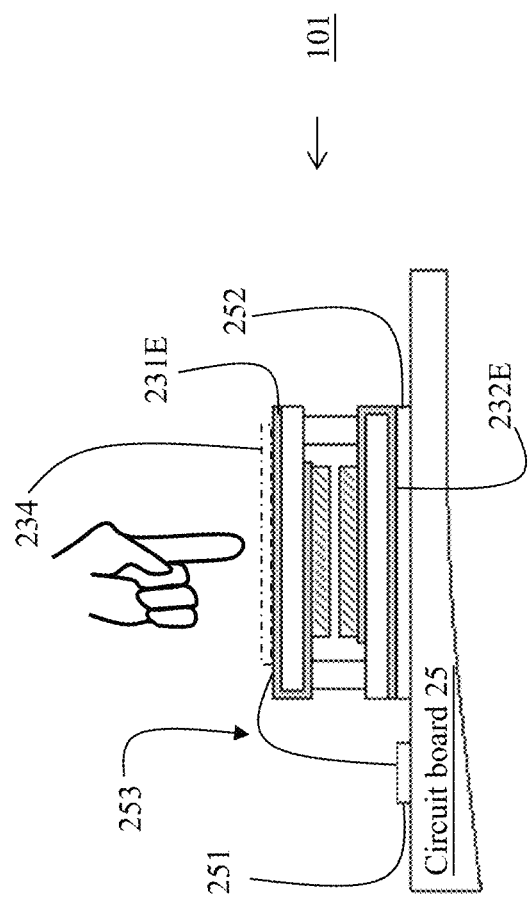

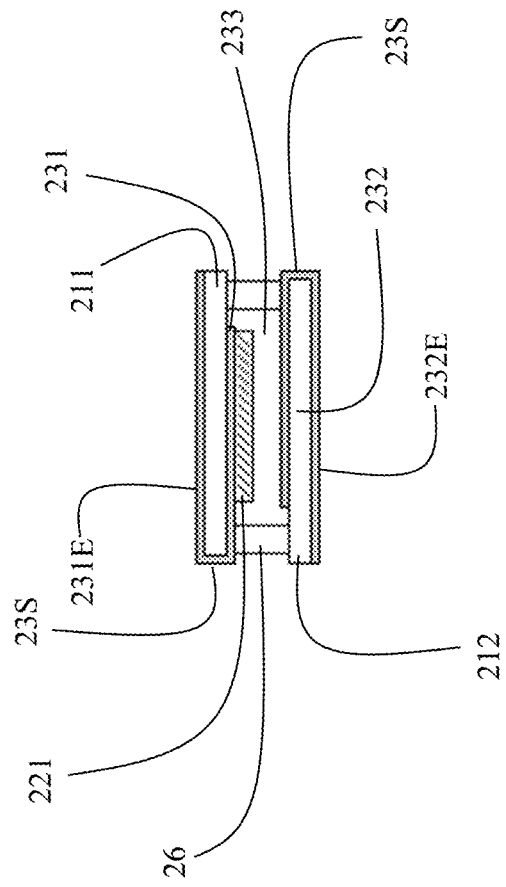

SURFACE MOUNT FORCE SENSING MODULE

BACKGROUND

Technical Field

The present invention relates to a force sensing module, especially related to a surface mount force sensing module which is amenable for mounting onto a circuit board.

Description of Related Art

FIGS. 1A~1B Show a Prior Art

FIG. 1A shows a traditional force sensing module 111. The force sensing module 111 has a force sensing module 11, and a piece of flexible circuit board 13 extents from the force sensing module 11. A pair of circuits 12 configured on the flexible circuit 13. A pair of electrode pins 14 is electrically coupled to the force sensing module 11 through the circuit board 13.

FIG. 1B shows the force sensing module 111 is connected to a circuit board 152 of a connector 15. The pair of electrode pins 14 is soldered onto a pair of metal contacts 151 of the circuit board 152 for forces detection.

The traditional force sensing module 111 needs a flexible circuit board 13 for electrical connection, which occupies more spaces and is prone to being severed by an external impact. A compact force sensing module with a simpler connection is desired in the mobile devices that demand a more compact packaging method. The present invention discloses a compact force sensing module requiring minimal footprint for connectors.

BRIEF DESCRIPTION OF THE DRAWINGS

FIGS. 2A~2B show a first embodiment according to the present invention.

FIG. 3 shows the first embodiment mounted on a top surface of a circuit board according to the present invention.

FIG. 4 shows a first modified version of the first embodiment according to the present invention.

DETAILED DESCRIPTION OF THE INVENTION

Figure 1A:
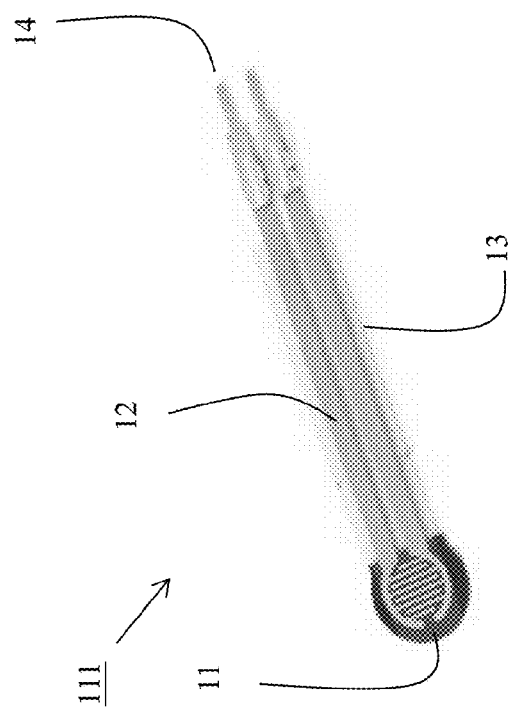
FIGS. 1A~1B show a prior art
Figure 1B:
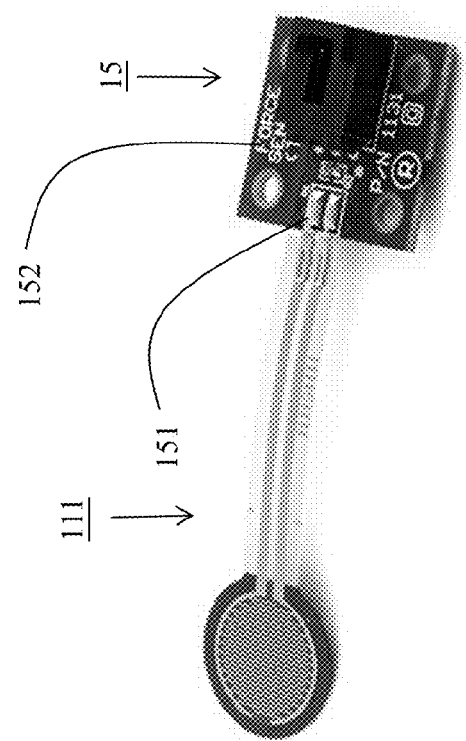

The present invention discloses a surface mount force sensing module adaptive for mounting onto a top surface of a circuit board.

FIGS. 2A~2B Show a First Embodiment According to the Present Invention.

FIG. 2 shows a surface mount force sensing module 101. The force sensing module 101 has a top substrate 211 and a bottom substrate 212.

A top inner electrode 231 is configured on a bottom surface of the top substrate 211. A top piezo material 221 is configured on a bottom surface of the top inner electrode 231. A top conductive pad 231E, electrically coupled to the top inner electrode 231 through a side wall metal 23S, is configured on a top surface of the top substrate 211.

The piezo material used in this invention is piezo-electric material, piezo-resistive material, or piezo-capacitive material.

A bottom inner electrode 232 is configured on a top surface of the bottom substrate 212. A bottom piezo material 222 is configured on a top surface of the bottom inner electrode 232. A bottom conductive pad 232E, electrically coupled to the bottom inner electrode 232 through a side wall metal 23S, configured on a bottom surface of the bottom substrate 212.

The side wall metal 23S can be established through conventional processes, e.g. a plated through hole (PTH) fabricating processes for a printed circuit board, or formed through dispensing conductive silver paste. A plated through hole (PTH) can also be a design choice to replace the side metal wall 23S according to the present invention as disclosed in FIG. 2B.

A gap 233 is configured between the top piezo material 221 and the bottom piezo material 222 for maintaining the circuitry of the force sensing module to be open. However, the gap 233 can be zero while still keep the circuitry open due to lack of conductive pathway between the two piezo materials at zero force. A ring spacer 26 is configured between the top substrate 221 and the bottom substrate 222 for maintaining the gap 233.

FIG. 2B shows a plated through hole 23P can be used as an electrical connection between the top inner electrode 231 and the top conductive pad 231E.

FIG. 3 Shows the First Embodiment Mounted on a Top Surface of a Circuit Board According to the Present Invention.

FIG. 3 shows the force sensing module 101 mounted on a top surface of a circuit board 25 as an example for the usage of the force sensing module 101. The circuit board 25 has a first metal pad 251 and a second metal pad 252 configured on the top surface of the circuit board 25. The bottom conductive pad 232E of the force sensing module 101 is mounted onto the second metal pad 252 of the circuit board 25. The top conductive pad 231E of the force sensing module 101 is bonded to the first metal pad 251 of the circuit board 25 through a wire bond 253. The force sensing module 101 is electrically coupled to a control system (not shown) through the circuitry (not shown) of the circuit board 25.

When a user presses the force sensing module 101 from top side, the force sensing module 101 generates a corresponding signal for a further process in the control system (not shown) through the circuitry of the circuit board 25.

An insulation layer 234 is optional configured on a top surface of the top conductive pad 231E for electrical insulation when the top surface of the force sensing module 101 is designed for human finger press.

FIG. 4 Shows a First Modified Version of the First Embodiment According to the Present Invention.

FIG. 4 shows a modified force sensing module 102 where the bottom piezo material 222 of FIG. 2A is removed. The rest structures and operation principles of FIG. 4 are similar to those of FIG. 2A.

Figure 5:
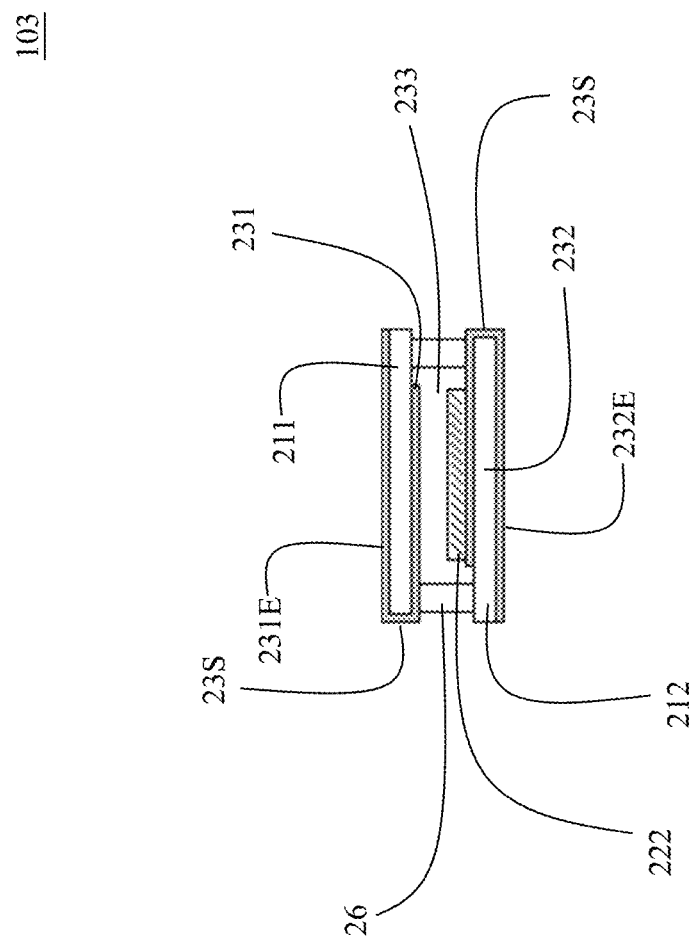
FIG. 5 shows a second modified version of the first embodiment according to the present invention.

FIG. 5 Shows a Second Modified Version of the First Embodiment According to the Present Invention.

FIG. 4 shows a modified force sensing module 103 where the top piezo material 221 of FIG. 2A is removed. The rest structures and operation principles of FIG. 4 are similar to those of FIG. 2A.

Figure 6:
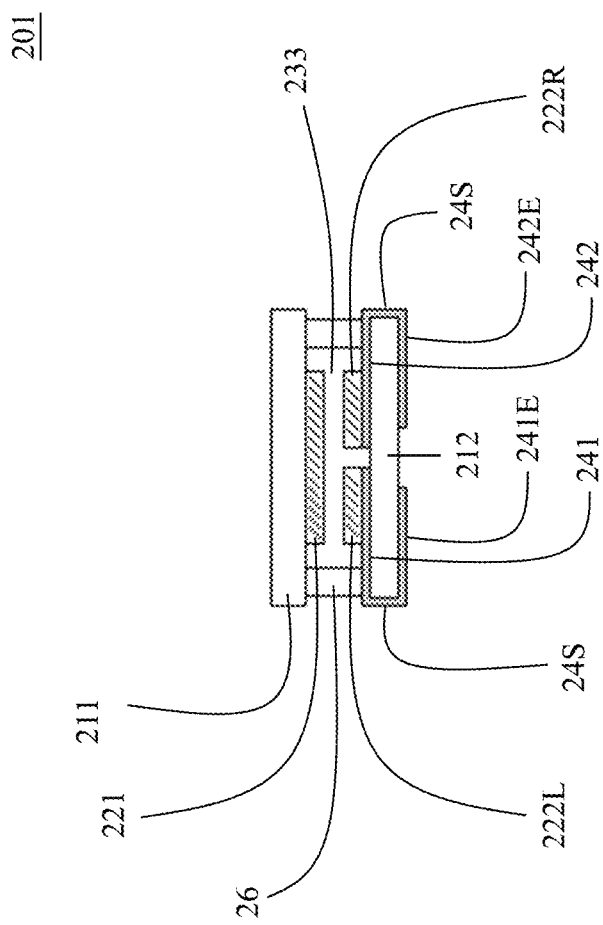
FIG. 6 shows a second embodiment according to the present invention.

FIG. 6 Shows a Second Embodiment According to the Present Invention.

FIG. 6 shows a surface mount force sensing module 201. The force sensing module 201 has a top substrate 211 and a bottom substrate 212. A top piezo material 221 is configured on a bottom surface of the top substrate 211.

A bottom left inner electrode 241 is configured on a bottom left of the bottom substrate 212. A bottom left piezo material 222L is configured on a top surface of the bottom left inner electrode 241. A bottom left conductive pad 241E, electrically coupled to the bottom left inner electrode 241 through a side wall metal 24S, is configured on a bottom left of the bottom substrate 212.

A bottom right inner electrode 242 is configured on a bottom right of the bottom substrate 212. A bottom right piezo material 222R is configured on a top surface of the bottom right inner electrode 242. A bottom right conductive pad 242E, electrically coupled to the bottom right inner electrode 242 through a side wall metal 24S, is configured on a bottom right of the bottom substrate 212.

A gap 233 configured between the top piezo material 221 and the bottom piezo materials 222L, 222R for maintaining the circuitry of the force sensing module to be open. However, the gap 233 can be zero while still keep the circuitry open-circuit due to lack of conductive pathway between the piezo materials at zero force. A ring spacer 26 is configured between the top substrate 221 and the bottom substrate 212 for maintaining the gap 233.

Figure 7:
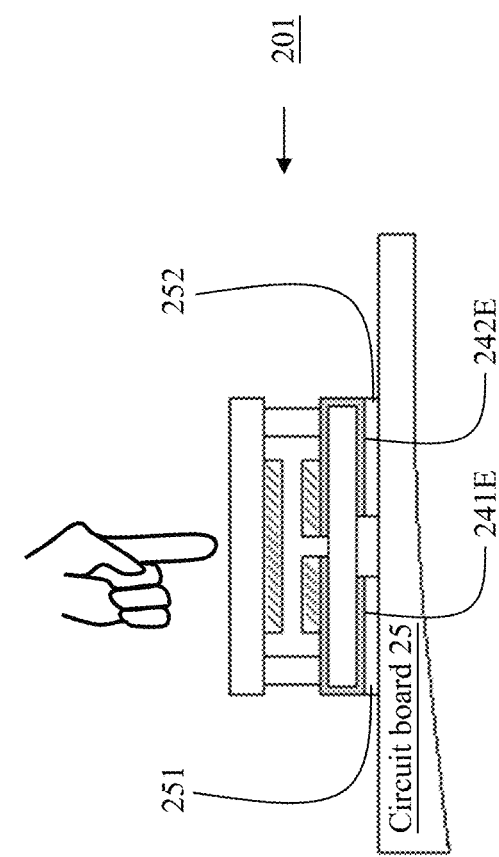
FIG. 7 shows the second embodiment mounted on a top surface of a circuit board according to the present invention.

FIG. 7 Shows the Second Embodiment Mounted on a Top Surface of a Circuit Board According to the Present Invention.

FIG. 7 shows the force sensing module 201 mounted on a top surface of a circuit board 25. The circuit board 25 has a first metal pad 251 and a second metal pad 252 configured on the top surface of the circuit board 25. The bottom left conductive pad 241E of the force sensing module 201 is mounted onto the first metal pad 251 of the circuit board 25. The bottom right conductive pad 242E of the force sensing module 201 is mounted to the second metal pad 252 of the circuit board 25.

When a user presses the force sensing module 201 from top side, the force sensing module 201 generates a corresponding signal for a further process in the control system (not shown) through the circuitry of the circuit board 25.

Figure 8:
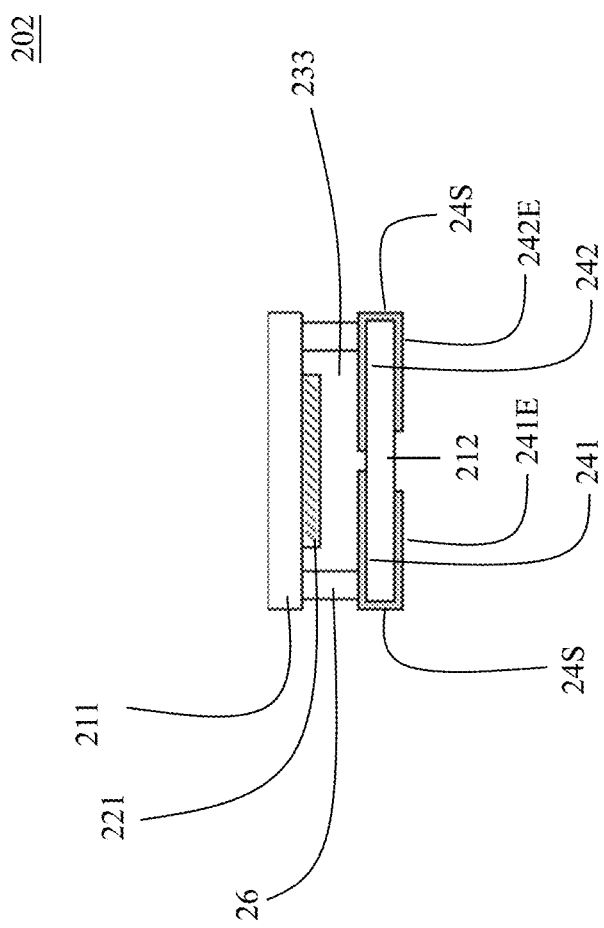
FIG. 8 shows a first modified version of the second embodiment according to the present invention.

FIG. 8 Shows a First Modified Version of the Second Embodiment According to the Present Invention.

FIG. 8 shows a modified force sensing module 202 where the bottom piezo materials 222L, 222R of FIG. 7 are removed. The rest structures and operation principles of FIG. 8 are similar to those of FIG. 7.

Figure 9:
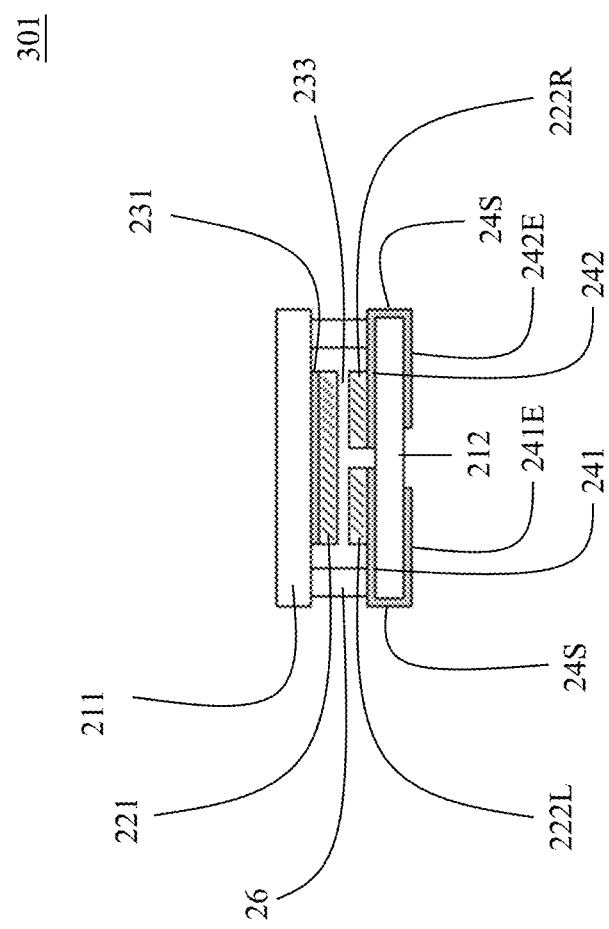
FIG. 9 shows a third embodiment according to the present invention.

FIG. 9 Shows a Third Embodiment According to the Present Invention.

FIG. 9 shows a surface mount force sensing module 301. The force sensing module 301 has a top substrate 211 and a bottom substrate 212.

A top inner conductive pad 231 is configured on a bottom surface of the top substrate 211. A piezo material 221 is configured on a bottom surface a top inner conductive pad 231.

A bottom left inner electrode 241 is configured on a bottom left of the bottom substrate 212. A bottom left piezo material 222L is configured on a top surface of the bottom left inner electrode 241. A bottom left conductive pad 241E, electrically coupled to the bottom left inner electrode 241 through a side wall metal 24S, is configured on a bottom left of the bottom substrate 212.

A bottom right inner electrode 242 is configured on a bottom right of the bottom substrate 212. A bottom right piezo material 222R is configured on a top surface of the bottom right inner electrode 242. A bottom right conductive pad 242E, electrically coupled to the bottom right inner electrode 242 through a side wall metal 24S, is configured on a bottom right of the bottom substrate 212.

A gap 233 configured between the top piezo material 221 and the bottom piezo materials 222L, 222R for maintaining the circuitry of the force sensing module to be open. However, the gap 233 can be zero while still keep the circuitry open circuit due to lack of conductive pathway between the piezo materials at zero force. A ring spacer 26 is configured between the top substrate 221 and the bottom substrate 212 for maintaining the gap 233.

Figure 10:
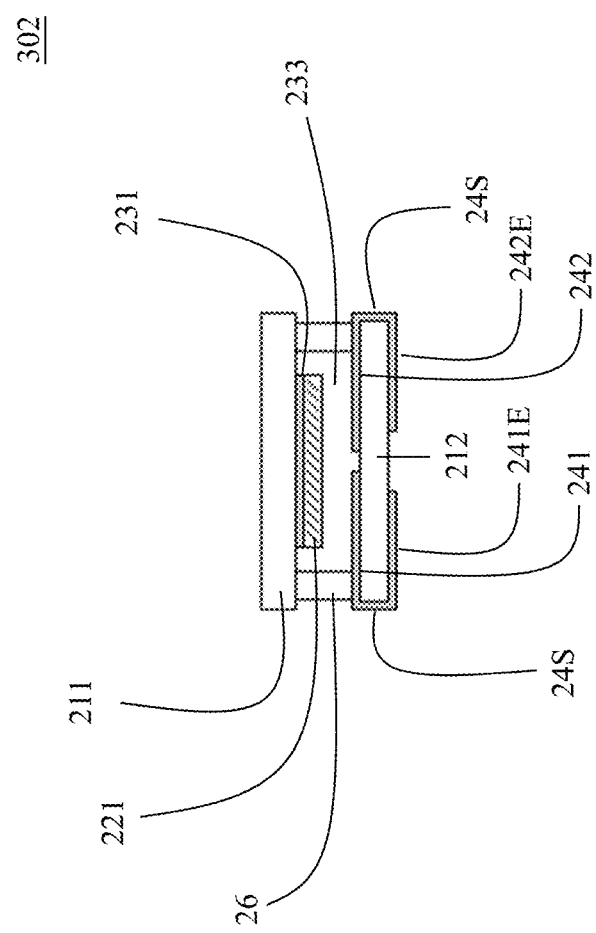
FIG. 10 shows a first modified version of the third embodiment according to the present invention.

FIG. 10 Shows a First Modified Version of the Third Embodiment According to the Present Invention.

FIG. 10 shows a modified force sensing module 302 where the bottom piezo materials 222L, 222R of FIG. 9 are removed. The rest structures and operation principles of FIG. 10 are similar to those of FIG. 9.

Figure 11:
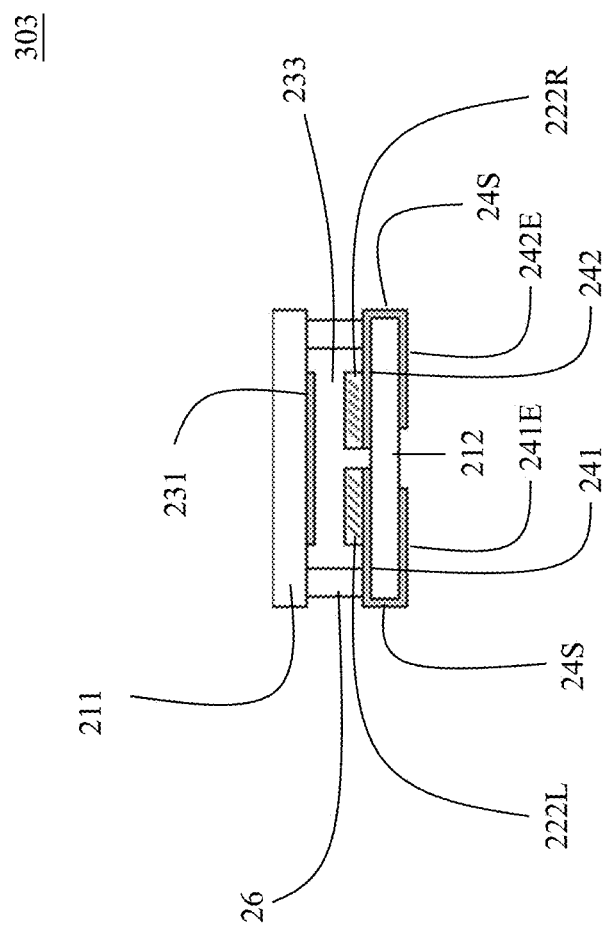
FIG. 11 shows a second modified version of the third embodiment according to the present invention.

FIG. 11 Shows a Second Modified Version of the Third Embodiment According to the Present Invention.

FIG. 11 shows a modified force sensing module 303 where the top piezo material 221 of FIG. 9 is removed. The rest structures and operation principles of FIG. 11 are similar to those of FIG. 9.

Figure 12:
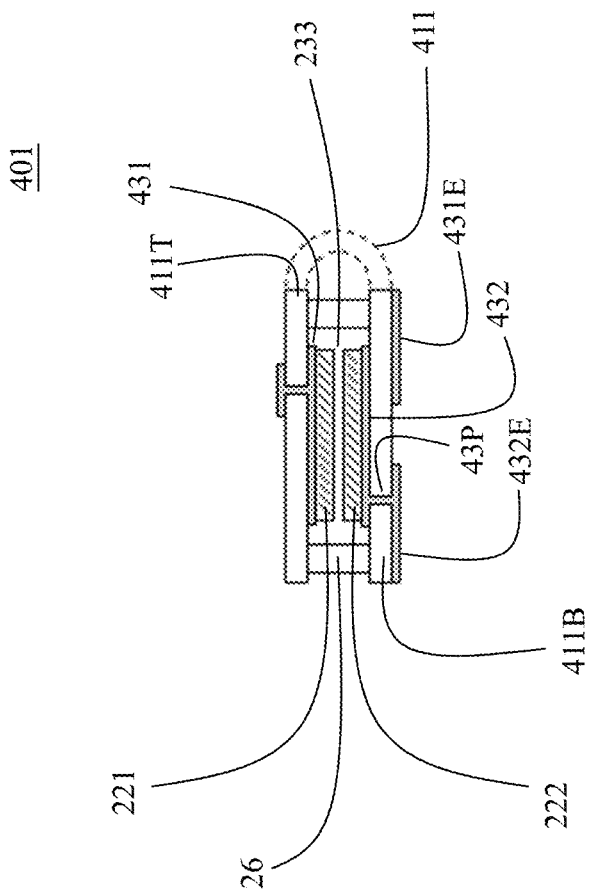
FIG. 12 shows a fourth embodiment according to the present invention.

FIG. 12 Shows a Fourth Embodiment According to the Present Invention.

FIG. 12 shows a surface mount force sensing module 401. The force sensing module 401 has a flexible substrate 411. The flexible substrate 411 is folded to form a top flat section 411T and a bottom flat section 411B.

A top inner electrode 431 is configured on a bottom surface of the top section 411T. A top piezo material 221 is configured on a bottom surface of the top inner electrode 431. A bottom conductive pad 431E, electrically coupled to the top inner electrode 431, is configured on a bottom right of the bottom section 411B.

A bottom inner electrode 432 is configured on a top surface of the bottom section 411B. A bottom piezo material 222 is configured on a top surface of the bottom inner electrode 432. A bottom conductive pad 432E, electrically coupled to the bottom inner electrode 432 through a plated through hole (PTH) 43P, configured on a bottom left of the bottom section 411B.

A gap 233 is configured between the top piezo material 221 and the bottom piezo material 222 for maintaining the circuitry of the force sensing module to be open. However, the gap 233 can be zero while still keep the circuitry open-circuit due to lack of a conductive pathway between the two piezo materials at zero force. A ring spacer 26 is configured between the top substrate 221 and the bottom substrate 222 for maintaining the gap 233.

Figure 13:
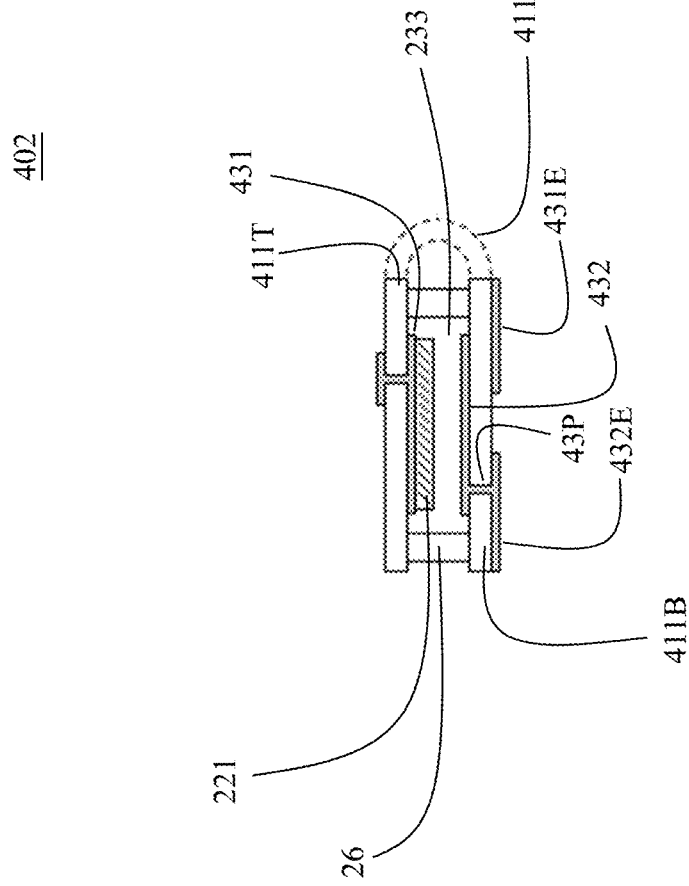
FIG. 13 shows a first modified version of the fourth embodiment according to the present invention.

FIG. 13 Shows a First Modified Version of the Fourth Embodiment According to the Present Invention.

FIG. 13 shows a modified force sensing module 402 where the bottom piezo materials 222 of FIG. 12 is removed. The rest structures and operation principles of FIG. 13 are similar to those of FIG. 12.

Figure 14:
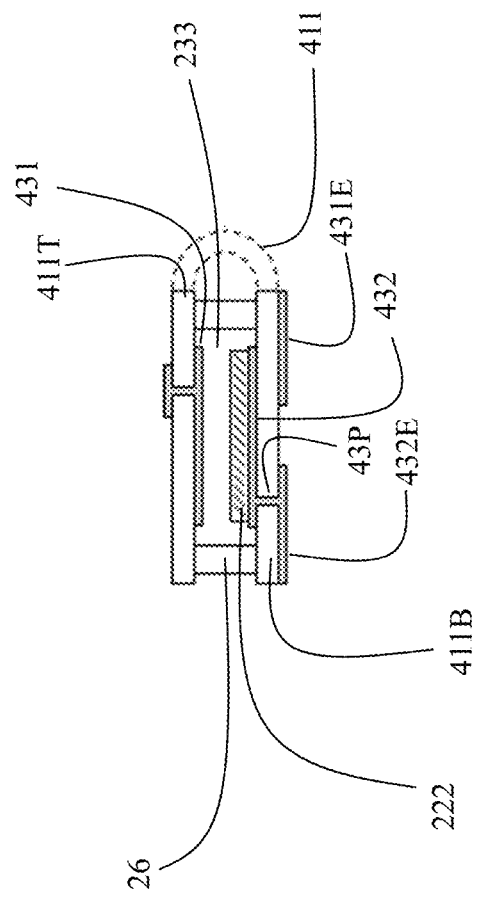
FIG. 14 shows a second modified version of the fourth embodiment according to the present invention.

FIG. 14 Shows a Second Modified Version of the Fourth Embodiment According to the Present Invention.

FIG. 14 shows a modified force sensing module 403 where the top piezo material 221 of FIG. 12 is removed. The rest structures and operation principles of FIG. 14 are similar to those of FIG. 12.

Figure 15:
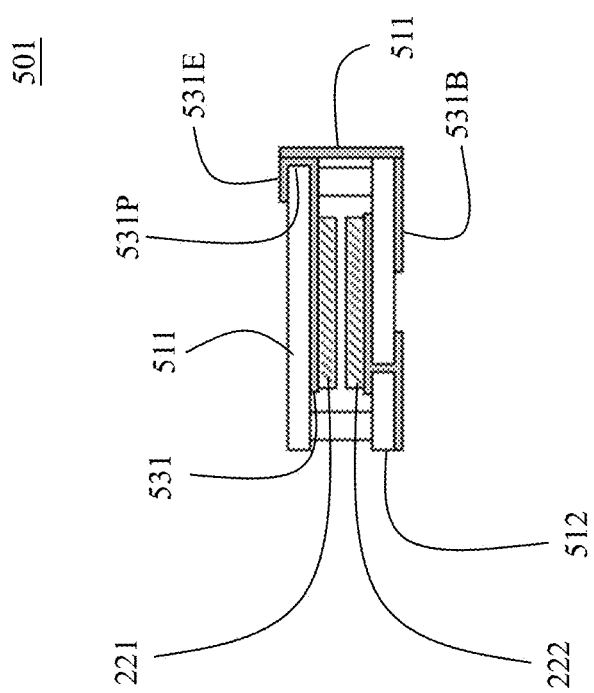
FIG. 15 shows a fifth embodiment according to the present invention.

FIG. 15 Shows a Fifth Embodiment According to the Present Invention.

FIG. 15 shows a surface mount force sensing module 501. The force sensing module 501 has a top substrate 511 and a bottom substrate 512.

A top inner electrode 531 is configured on a bottom surface of the top substrate 511. The top conductive pad 531E, formed on a top surface of the top substrate 511, is an extension of the inner electrode 531. The top inner electrode 531 extends to the top conductive pad 531E through a side wall conductive material 531P. A conductive bridging material 511, such as a conductive paste, side wall metal plating, or equivalent, is configured on the side wall of the module to electrically couple the side wall metal 531P to the bottom right electrode 531B. The rest structure and operation principles are similar to those for FIG. 12.

Figure 16:
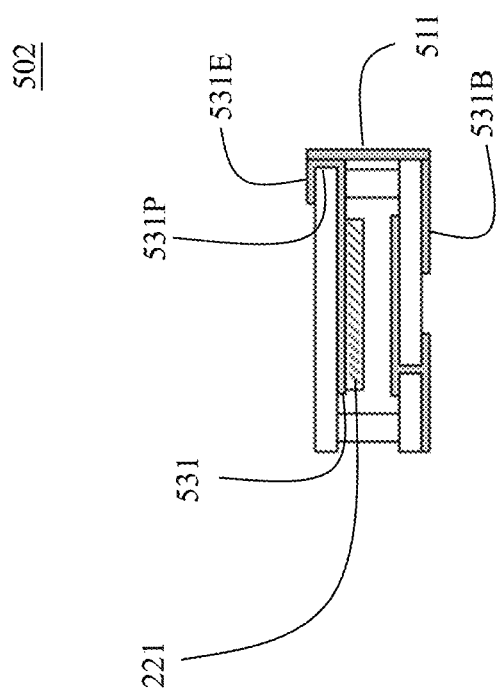
FIG. 16 shows a first modified version of the fifth embodiment according to the present invention.

FIG. 16 Shows a First Modified Version of the Fifth Embodiment According to the Present Invention.

FIG. 16 shows a modified force sensing module 502 where the bottom piezo materials 222 of FIG. 15 is removed. The rest structures and operation principles of FIG. 16 are similar to those of FIG. 15.

Figure 17:
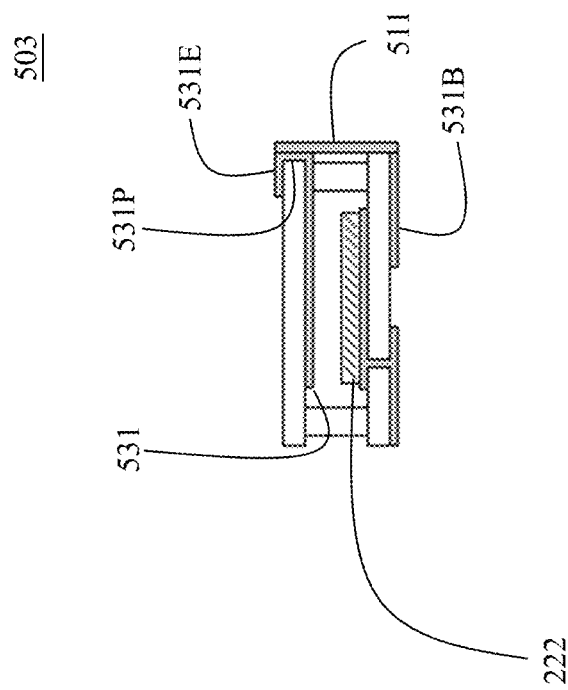
FIG. 17 shows a second modified version of the fifth embodiment according to the present invention.

FIG. 17 Shows a Second Modified Version of the Fifth Embodiment According to the Present Invention.

FIG. 17 shows a modified force sensing module 503 where the top piezo material 221 of FIG. 15 is removed. The rest structures and operation principles of FIG. 17 are similar to those of FIG. 15.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. A surface mount force sensing module, comprising: a top inner electrode, configured on a bottom surface of a top substrate; a bottom inner electrode, configured on a top surface of a bottom substrate; a piezo material, configured between the top inner electrode and the bottom inner electrode; a top conductive pad, electrically coupled to the top inner electrode, configured on a top surface of the top substrate; a bottom conductive pad, electrically coupled to the bottom inner electrode, configured on a bottom surface of the bottom substrate; and:
    a gap between the piezo material and the bottom inner electrode,
    wherein
    the piezo material is on a bottom surface of the top inner electrode, and
    in response to a press applied to the surface mount force sensing module from the top substrate toward the bottom substrate, the piezo material and the bottom inner electrode are contactable with each other to create an electrical path between the top inner electrode and the bottom inner electrode via the piezo material.

2. A surface mount force sensing module, comprising: a top inner electrode, configured on a bottom surface of a top substrate; a bottom inner electrode, configured on a top surface of a bottom substrate; a piezo material, configured between the top inner electrode and the bottom inner electrode; a top conductive pad, electrically coupled to the top inner electrode, configured on a top surface of the top substrate; a bottom conductive pad, electrically coupled to the bottom inner electrode, configured on a bottom surface of the bottom substrate; and:
    a gap between the top inner electrode and the piezo material,
    wherein
    the piezo material is on a top surface of the bottom inner electrode, and
    in response to a press applied to the surface mount force sensing module from the top substrate toward the bottom substrate, the piezo material and the top inner electrode are contactable with each other to create an electrical path between the top inner electrode and the bottom inner electrode via the piezo material.

3. A surface mount force sensing module, comprising: a top inner electrode, configured on a bottom surface of a top substrate; a bottom inner electrode, configured on a top surface of a bottom substrate; a piezo material, configured between the top inner electrode and the bottom inner electrode; a top conductive pad, electrically coupled to the top inner electrode, configured on a top surface of the top substrate; a bottom conductive pad, electrically coupled to the bottom inner electrode, configured on a bottom surface of the bottom substrate; and:
    a circuit board below the bottom substrate, the circuit board having
        a top surface, and
        first and second metal pads on the top surface of the circuit board; and
    a bonding wire electrically connecting the first metal pad of the circuit board to the top conductive pad on the top surface of the top substrate,
    wherein the bottom conductive pad on the bottom surface of the bottom substrate is surface-mounted on and electrically connected to the second metal pad of the circuit board.

4. A surface mount force sensing module, comprising: a top inner electrode, configured on a bottom surface of a top substrate; a bottom inner electrode, configured on a top surface of a bottom substrate; a piezo material, configured between the top inner electrode and the bottom inner electrode; a top conductive pad, electrically coupled to the top inner electrode, configured on a top surface of the top substrate; a bottom conductive pad, electrically coupled to the bottom inner electrode, configured on a bottom surface of the bottom substrate, wherein the piezo material comprises a top section piezo material and a bottom section piezo material, said surface mount force sensing module further comprising:
    a gap between the top section piezo material and the bottom section piezo material,
    wherein
    the top section piezo material is on a bottom surface of the top inner electrode,
    the bottom section piezo material is on a top surface of the bottom inner electrode, and in response to a press applied to the surface mount force sensing module from the top substrate toward the bottom substrate, the top section piezo material and the bottom section piezo material are contactable with each other to create an electrical path between the top inner electrode and the bottom inner electrode via the top section piezo material and the bottom section piezo material.

5. A surface mount force sensing module, comprising:
a top piezo material, configured on a bottom surface of a top substrate;
a bottom left inner electrode, configured on a bottom left of a bottom substrate;
a bottom right inner electrode, configured on a bottom right of the bottom substrate;
a bottom left conductive pad electrically coupled to the bottom left inner electrode, configured on a bottom left of the bottom substrate; and
a bottom right conductive pad electrically coupled to the bottom right inner electrode, configured on a bottom right of the bottom substrate.

6. A surface mount force sensing module as claimed in claim 5, further comprising:
a bottom left piezo material on a top surface of the bottom left inner electrode;
a bottom right piezo material on a top surface of the bottom right inner electrode; and
a gap between (i) the top piezo material and (ii) the bottom left and right piezo materials,
wherein
the bottom left piezo material is spaced from the bottom right piezo material by a spacing, and
the top piezo material extends over the bottom left and right piezo materials and across the spacing.

7. A surface mount force sensing module as claimed in claim 6, further comprising:
a circuit board below the bottom substrate, the circuit board having
a top surface, and
a left conductive pad and a right conductive pad on the top surface of the circuit board;
wherein
the bottom left conductive pad is on a bottom surface of the bottom substrate and is surface-mounted on and electrically connected to the left conductive pad of the circuit board, and
the bottom right conductive pad is on the bottom surface of the bottom substrate and is surface-mounted on and electrically connected to the right conductive pad of the circuit board.

8. A surface mount force sensing module as claimed in claim 5, further comprising:
a gap between (i) the top piezo material and (ii) the bottom left and right inner electrodes,
wherein
the bottom left inner electrode is spaced from the bottom right inner electrode by a spacing, and
the top piezo material extends over the bottom left and right inner electrodes and across the spacing.

9. A surface mount force sensing module, comprising:
a top inner conductive pad on a bottom surface of a top substrate;
a bottom left inner electrode on a bottom left of a bottom substrate;
a bottom right inner electrode on a bottom right of the bottom substrate;
a piezo material between (i) the top inner conductive pad and (ii) the bottom left and right inner electrodes;
a bottom left conductive pad electrically coupled to the bottom left inner electrode, and on a bottom left of the bottom substrate; and
a bottom right conductive pad electrically coupled to the bottom right inner electrode, and on a bottom right of the bottom substrate.

10. A surface mount force sensing module as claimed in claim 9, wherein
the piezo material comprises a top piezo material on a bottom surface of the top inner conductive pad,
the bottom left inner electrode is spaced from the bottom right inner electrode by a spacing, and
the top piezo material extends over the bottom left and right inner electrodes and across the spacing.

11. A surface mount force sensing module as claimed in claim 10, the piezo material further comprising:
a bottom left piezo material on a top surface of the bottom left inner electrode; and
a bottom right piezo material on a top surface of the bottom right inner electrode, wherein
the bottom left piezo material is spaced from the bottom right piezo material by said spacing, and
the top piezo material and the top inner conductive pad extend over the bottom left and right piezo materials and across the spacing.

12. A surface mount force sensing module as claimed in claim 11, further comprising:
a gap between (i) the top piezo material and (ii) the bottom left and right piezo materials,
wherein, in response to a press applied to the surface mount force sensing module from the top substrate toward the bottom substrate, the top piezo material is contactable with the bottom left and right piezo materials to create an electrical path between the bottom left and right inner electrodes via the top piezo material and the bottom left and right piezo materials.

13. A surface mount force sensing module as claimed in claim 10, further comprising:
a gap between (i) the top piezo material and (ii) the bottom left and right inner electrodes,
wherein, in response to a press applied to the surface mount force sensing module from the top substrate toward the bottom substrate, the top piezo material is contactable with the bottom left and right inner electrodes to create an electrical path between the bottom left and right inner electrodes via the top piezo material.

14. A surface mount force sensing module as claimed in claim 9, wherein the piezo material comprises:
a bottom left piezo material on a top surface of the bottom left inner electrode; and
a bottom right piezo material on a top surface of the bottom right inner electrode,
wherein
the bottom left piezo material is spaced from the bottom right piezo material by a spacing, and
the top inner conductive pad extends over the bottom left and right piezo materials and across the spacing.

15. A surface mount force sensing module as claimed in claim 14, further comprising:
a gap between (i) the top inner conductive pad and (ii) the bottom left and right piezo materials,
wherein, in response to a press applied to the surface mount force sensing module from the top substrate toward the bottom substrate, the top inner conductive pad is contactable with the bottom left and right piezo materials to create an electrical path between the bottom left and right inner electrodes via the top inner conductive pad and the bottom left and right piezo materials.

16. A surface mount force sensing module as claimed in claim 9, further comprising:
a circuit board below the bottom substrate, the circuit board having
a top surface, and
a left conductive pad and a right conductive pad on the top surface of the circuit board;
wherein
the bottom left conductive pad is on a bottom surface of the bottom substrate and is surface-mounted on and electrically connected to the left conductive pad of the circuit board, and
the bottom right conductive pad is on the bottom surface of the bottom substrate and is surface-mounted on and electrically connected to the right conductive pad of the circuit board.

17. A surface mount force sensing module, comprising:
a flexible substrate folded with a top section and a bottom section;
a top inner electrode, on a bottom surface of the top section of the flexible substrate;
a bottom inner electrode, on a top surface of the bottom section of the flexible substrate;
a piezo material between the top inner electrode and the bottom inner electrode;
a bottom left conductive pad electrically coupled to the bottom inner electrode, and on a bottom left surface of the bottom section of the flexible substrate; and
a bottom right conductive pad electrically coupled to the top inner electrode, and on a bottom right surface of the bottom section of the flexible substrate.

18. A surface mount force sensing module as claimed in claim 17, further comprising:
a gap between the piezo material and the bottom inner electrode,
wherein
the piezo material is on a bottom surface of the top inner electrode, and
in response to a press applied to the surface mount force sensing module from the top section of the flexible substrate toward the bottom section of the flexible substrate, the piezo material and the bottom inner electrode are contactable with each other to create an electrical path between the top inner electrode and the bottom inner electrode via the piezo material.

19. A surface mount force sensing module as claimed in claim 17, further comprising:
a gap between the top inner electrode and the piezo material,
wherein
the piezo material is on a top surface of the bottom inner electrode, and
in response to a press applied to the surface mount force sensing module from the top section of the flexible substrate toward the bottom section of the flexible substrate, the piezo material and the top inner electrode are contactable with each other to create an electrical path between the top inner electrode and the bottom inner electrode via the piezo material.

20. A surface mount force sensing module as claimed in claim 17, further comprising:

a top conductive pad electrically coupled to the top inner electrode, and on a top surface of the top section of the flexible substrate,
wherein
the flexible substrate further comprises a curved section continuous to the top section and the bottom section, and connecting the top section to the bottom section,
the bottom left conductive pad is electrically connected to the bottom inner electrode, and
the bottom right conductive pad is electrically connected to the top conductive pad.

21. A surface mount force sensing module as claimed in claim 20, wherein the piezo material comprises a top section piezo material and a bottom section piezo material, said surface mount force sensing module further comprising:
a gap between the top section piezo material and the bottom section piezo material,
wherein
the top section piezo material is on a bottom surface of the top inner electrode,
the bottom section piezo material is on a top surface of the bottom inner electrode, and
in response to a press applied to the surface mount force sensing module from the top section of the flexible substrate toward the bottom section of the flexible substrate, the top section piezo material and the bottom section piezo material are contactable with each other to create an electrical path between the top inner electrode and the bottom inner electrode via the top section piezo material and the bottom section piezo material.

22. A surface mount force sensing module as claimed in claim 17, further comprising:
a circuit board below the bottom section of the flexible substrate, the circuit board having
a top surface, and
a left conductive pad and a right conductive pad on the top surface of the circuit board;
wherein
the bottom left conductive pad is surface-mounted on and electrically connected to the left conductive pad of the circuit board, and
the bottom right conductive pad is surface-mounted on and electrically connected to the right conductive pad of the circuit board.

23. A surface mount force sensing module, comprising:
a top inner electrode, on a bottom surface of a top substrate;
a bottom inner electrode, on a top surface of a bottom substrate;
a piezo material between the top inner electrode and the bottom inner electrode;
a bottom left conductive pad electrically coupled to the bottom inner electrode, and on a bottom left surface of the bottom substrate; and
a bottom right conductive pad electrically coupled to the top inner electrode through conductive bridge material configured on a side wall, wherein the bottom right conductive pad is on a bottom right surface of the bottom section of the bottom substrate.

24. A surface mount force sensing module as claimed in claim 23, further comprising:
a gap between the piezo material and the bottom inner electrode,
wherein
the piezo material is on a bottom surface of the top inner electrode, and in response to a press applied to the surface mount force sensing module from the top substrate toward the bottom substrate, the piezo material and the bottom inner electrode are contactable with each other to create an electrical path between the top inner electrode and the bottom inner electrode via the piezo material.

25. A surface mount force sensing module as claimed in claim 23, further comprising:
a gap between the top inner electrode and the piezo material,
wherein
the piezo material is on a top surface of the bottom inner electrode, and
in response to a press applied to the surface mount force sensing module from the top substrate toward the bottom substrate, the piezo material and the top inner electrode are contactable with each other to create an electrical path between the top inner electrode and the bottom inner electrode via the piezo material.

26. A surface mount force sensing module as claimed in claim 23, further comprising:
a circuit board below the bottom substrate, the circuit board having
a top surface, and
a left conductive pad and a right conductive pad on the top surface of the circuit board;
wherein
the bottom left conductive pad on the bottom left surface of the bottom substrate is surface-mounted on and electrically connected to the left conductive pad of the circuit board, and
the bottom right conductive pad on the bottom right surface of the bottom substrate is surface-mounted on and electrically connected to the right conductive pad of the circuit board.

27. A surface mount force sensing module as claimed in claim 26, wherein the piezo material comprises a top section piezo material and a bottom section piezo material, said surface mount force sensing module further comprising:
a gap between the top section piezo material and the bottom section piezo material,
wherein
the top section piezo material is on a bottom surface of the top inner electrode,
the bottom section piezo material is on a top surface of the bottom inner electrode, and
in response to a press applied to the surface mount force sensing module from the top substrate toward the bottom substrate, the top section piezo material and the bottom section piezo material are contactable with each other to create an electrical path between the top inner electrode and the bottom inner electrode via the top section piezo material and the bottom section piezo material.

28. A surface mount force sensing module, comprising:
a top substrate and a bottom substrate;
a first inner electrode between the top substrate and the bottom substrate;
a piezo material between the top substrate and the bottom substrate;
a second inner electrode, between the top substrate and the bottom substrate;
a first outer conductive pad electrically coupled to one of the first inner electrode and the second inner electrode, and on one of the top substrate and the bottom substrate;
a second outer conductive pad electrically coupled to the other one of the first inner electrode and the second inner electrode, and on one of the top substrate and the bottom substrate; and
a circuit board below the bottom substrate, the circuit board having
a top surface, and
first and second metal pads on the top surface of the circuit board,
wherein
the first metal pad of the circuit board is electrically connected to the first outer conductive pad,
the second metal pad of the circuit board is electrically connected to the second outer conductive pad,
the first outer conductive pad is surface-mounted on the first metal pad of the circuit board, and
the first and second outer conductive pads are configured for a measurement of a property of the piezo material in response to a force applied against the surface mount force sensing module.

* * * * *